United States Patent [19]
Gay

[11] Patent Number: 4,609,781
[45] Date of Patent: Sep. 2, 1986

[54] BORSHT/SLIC AUTO BALANCING TECHNIQUE

[75] Inventor: Michael J. Gay, Coppet, Switzerland

[73] Assignee: Motorola, Inc., Schaumburg, Ill.

[21] Appl. No.: 666,090

[22] PCT Filed: Jan. 25, 1984

[86] PCT No.: PCT/GB84/00019
§ 371 Date: Sep. 27, 1984
§ 102(e) Date: Sep. 27, 1984

[87] PCT Pub. No.: WO84/03191
PCT Pub. Date: Aug. 16, 1984

[30] Foreign Application Priority Data
Feb. 1, 1983 [GB] United Kingdom ............... 8302673

[51] Int. Cl.[4] .................. H04B 1/58; H04B 3/03
[52] U.S. Cl. .................. 179/16 AA; 179/16 F; 179/170 NC
[58] Field of Search .............. 179/170 NC, 175.3 F, 179/175.3 R, 16 F, 16 AA, 18 FA, 78 R, 80 R

[56] References Cited
U.S. PATENT DOCUMENTS 4,320,257 3/1985 Warman ............................. 179/16 F
4,491,700 1/1985 Tahara et al. ................. 179/170 NC

FOREIGN PATENT DOCUMENTS 2437116 4/1980 France .
2042306 9/1980 United Kingdom .

OTHER PUBLICATIONS

"Integrated Circuits for Telephony", P. Gray et al., Proceeding of the IEEE, vol. 68, No. 8, Aug. 1980 pp. 991-1009.
"Monolithic Subscriber Line Circuit for PABX's", P. Picard et al., Conference: From Electronics to Microelectronics, Fourth European Conference on Electronics, Euro con '80, Stuttgart Germany 24-28 Mar. 1980, pp. 202-204.
"A Semiconductor SLIC", J. Robinson, Conference on Communications Equipment and Systems, 20-22 Apr. 1982, pp. 44-48.

Primary Examiner—Gene Z. Rubinson
Assistant Examiner—R. Vaas
Attorney, Agent, or Firm—Michael J. Gay

[57] ABSTRACT

Method of adjusting a BORSHT/SLIC circuit and to a circuit arrangement therefor. The BORSHT/SLIC circuit includes a pair of signal paths coupling a receive terminal of a four-wire interface with the terminals of a two-wire subscriber line. An applied current is periodically switched from one to the other of the terminals of the two-wire interface and the gain of at least one of the signal paths is adjusted in response to detected common mode signals induced by the applied current in a signal path coupling the terminals of the two-wire interface with the transmit terminal of the four-wire interface.

15 Claims, 4 Drawing Figures

BORSHT/SLIC AUTO BALANCING TECHNIQUE

TECHNICAL FIELD

This invention relates generally to a subscriber line interface circuit (SLIC) and to the more complex derivative known as a BORSHT circuit. The invention is particularly concerned with a method and apparatus for achieving the rejection of common mode (or longitudinal) signals which may appear on a subscribers telephone line.

BACKGROUND ART

A subscribers telephone is usually linked to the local telephone exchange by a telephone cable having two wires and usually known as the subscriber/two-wire line.

The local exchange is linked to other exchanges by a so-called four-wire line. Two of the four wires, (a signal line and a ground line) are used for transmitting telephone signals to other exchanges whilst the remaining two wires, (signal and ground) are used for receiving signals from other exchanges. In some cases a common ground line may be used thereby reducing the number of wires to three. The term four-wire is used herein to include such cases.

A BORSHT/SLIC circuit is located, in operation, in a telephone exchange and provides an interface between the four-wire line and the two-wire or subscriber line. The circuit has a four-wire interface including a receive terminal and transmit terminal and a two-wire interface to the subscriber line, formed by a pair of terminals.

A signal received on the receive terminal of the four-wire interface is applied by the circuit as a differential signal to the terminals of the two wire interface whilst a differential signal applied to the terminals of the two-wire interface, from the subscriber line, is fed to the transmit terminal of the four-wire interface.

Borsht and SLIC circuits must fulfill very stringent specifications for the rejection of common mode (longitudinal) signals which may appear on the subscriber line. Common mode signals are effectively identical currents flowing between each of the two wires of the two wire line and ground. Typically the common mode signals could be 50 Hz line current from the mains supply.

In addition to causing undesirable interference on the speech signals the common mode signals can be of large magnitude and can have a serious effect on electronic circuits coupled to the four-wire line.

To comply with the specifications, the gains in a number of different signal paths must be matched, or at least matched in appropriate pairs, to within the order of 0.1 or 0.2%.

It is generally not possible to build a SLIC or BORSHT having the required signal path matching except by adjustment after manufacture. To achieve this performance in a SLIC or BORSHT fabricated as an integrated circuit, recourse to laser trimming of thin film resistors deposited in the IC surface has generally benn envisaged.

It has also been proposed to use arrays of diffused resistors, with laser scribing to cut metal links therein, and combinations of rigorously symmetrical groups of diffused resistors which are assumed to yield the required matching provided the groups are large enough.

The above techniques of achieving the required signal path matching suffer serious drawbacks. The use of thin film resistors requires extra processing and this would at least increase manufacturing cost. Laser trimming or scribing is also expensive and causes potential reliability problems in high voltage circuits (BORSHT supply may be 150 v).

Diffused resistors change their values with stress due to bonding an IC to its package. Such stress could unbalance groups of resistors however distributed.

This invention seeks to provide a BORSHT/SLIC in which common mode signals may be reduced by adjustment of the gain of one or more signal paths wtihout recourse to laser trimming or scribing and to provide a method therefor.

BRIEF SUMMARY OF INVENTION

In accordance with a first aspect of the invention there is provided a method of adjusting a BORSHT/-SLIC circuit having a pair of signal paths coupling a receive terminal of a four-wire interface with the terminals of a two-wire subscriber line interface, the method including the steps of periodically switching an applied current from one to the other of the terminals of the two wire interface and adjusting the gain of at least one of the said signal paths in response to detected common mode signals induced by the applied current in a signal path coupling the terminals of the two-wire interface with the transmit terminal of the four-wire interface, whereby to reduce the magnitude of the common mode signals.

The applied current may be a direct current or may be a signal frequency current.

In one way of carrying out the invention nominally equal currents are applied to both terminals of the two wire interface and are periodically switched between the terminals in synchronism with one another.

The common mode signals may be detected by summing currents derived from the said signal path during each of two phases of the periodic switching.

In accordance with a second aspect of the invention there is provided a BORSHT/SLIC circuit arrangement including a pair of signal paths coupling a receive terminal of a four-wire interface with the terminals of a two-wire subscriber line interface; means for periodically switching an applied current from one to the other of the terminals of the two wire interface; means for detecting common mode signals induced by the applied current in a signal path coupling the terminals of the two-wire interface with the transmit terminal of the four-wire interface and means responsive to the detected common mode signals for adjusting the gain of at least one of the pair of signal paths whereby to reduce the magnitude of the common mode signals.

The means for periodically switching an applied current may comprise means for switching a direct current or for switching a signal frequency current.

Nominally equal currents may be applied to both terminals of the two-wire interface and periodically switched between the terminals in synchronism with one another.

The means for detecting the common mode signals may include means for summing currents derived from the said signal path during each of two phases of the periodic switching.

The means for adjusting the gain of the at least one signal path may include a programmable attenuator located in the said signal path.

A Microprocessor may be provided responsive to detected common mode signals for controlling the adjustment of the gain of the at least one signal path.

BRIEF DESCRIPTION OF DRAWINGS

The invention will now be further described with reference to the drawings in which;

Referring now to FIG. 1, the circuit shown has a two-wire interface provided by a pair of terminals 1, 2 (often referred to as TIP and RING). A receive terminal 3 and a transmit terminal 4 together with the ground reference provide the four-wire interface. The terminals 1 and 2 are coupled via resistors 5 and 6 respectively to input terminals 7 and 8 respectively of a unity gain, inverting, differential to single-ended converter 9. The input terminals 7 and 8 of the differential to single-ended converter 9 are coupled via resistors 10 and 11 respectively to an input terminal 12 of a unity gain amplifier 13 which has its second input terminal connected to ground.

Figure 1:
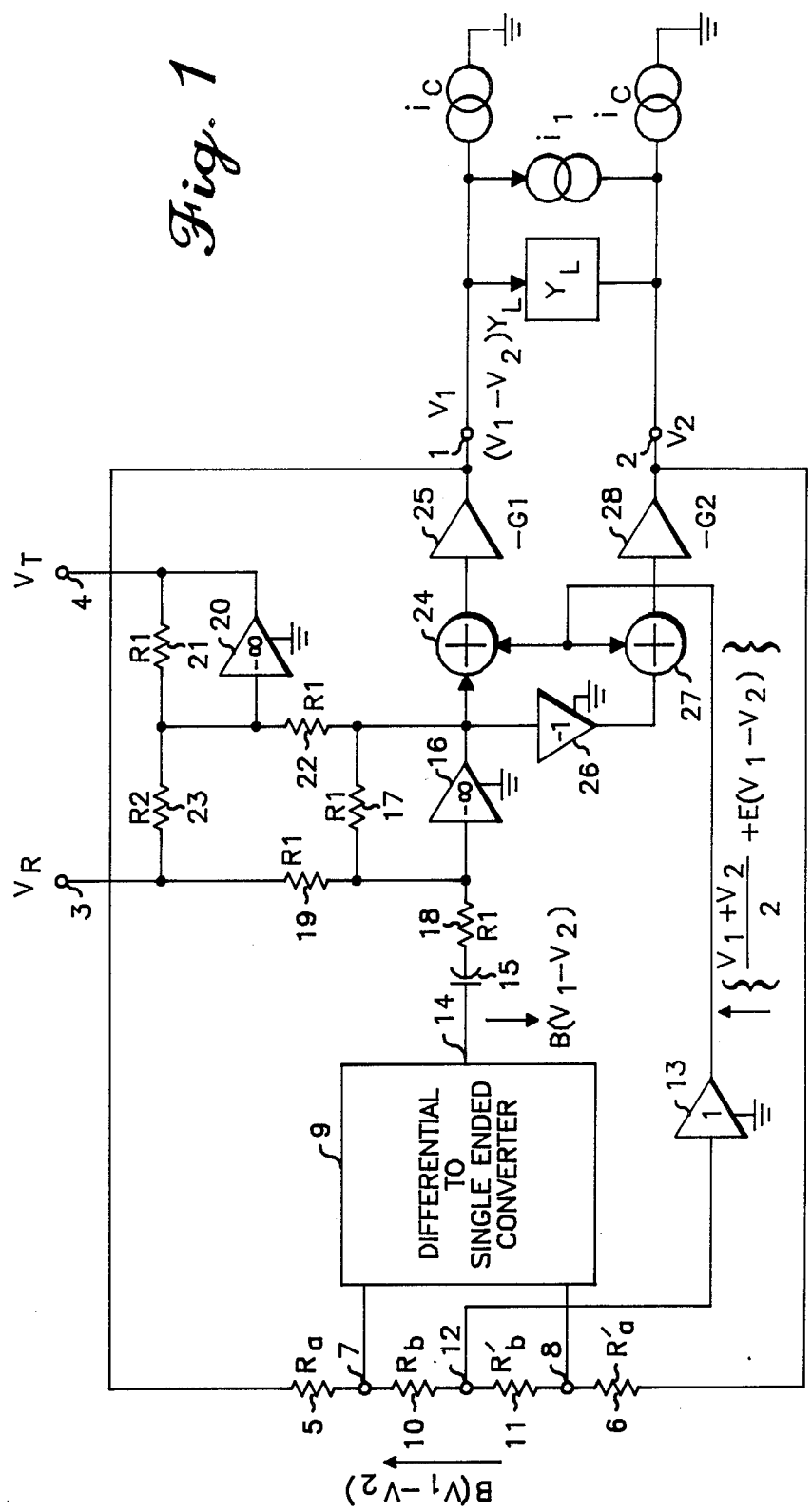
FIG. 1 is a block diagram illustrating the signal paths in a BORSHT circuit forming part of an embodiment of the invention.

The differential to single-ended converter 9 has an output 14 which is coupled via a dc blocking capacitor 15 to a unity gain inverting amplifier formed by a high gain inverting amplifier 16 having a feedback resistor 17 of value $R_1$ coupled between its input and its output and a series resistor 18 also of value $R_1$ coupled between the input of the amplifier 16 and the capacitor 15.

The unity gain amplifier 16, 17, 18 is also connected to receive any input signal $v_R$ applied to the receive input terminal 3, this received signal being coupled to the unity gain amplifier via the resistor 19 of value $R_1$.

The output of the unity gain amplifier 16, 17, 18 is also applied to a second unity gain inverting amplifier formed by a high gain inverting amplifier 20, a feedback resistor 21 of value $R_1$ connected between the output of the amplifier 20 and its input and a resistor 22 of value $R_1$ connected between the input of the amplifier 20 and the output of the unity gain amplifier 16, 17, 18.

The output of the unity gain amplifier 20, 21, 22 taken from the output of the amplifier 20 is fed to the transmit output terminal 4 of the four-wire interface to provide an output signal $v_T$. The unity gain inverting amplifier 20, 21, 22 is also connected to receive any signal applied to the receive input terminal 3 via a resistor 23 of value $R_2$.

The output of the unity gain amplifier 16, 17, 18 is also applied via a summing circuit 24 to an output stage 25 coupled to the terminal 1 of the two-wire interface. This amplifier output is also fed via an invertor 26, assumed to have unity gain, and a summing circuit 27 to a second output stage 28 which coupled to the terminal 2 of the two-wire interface. The output stages 25 and 28 are both inverting voltage controlled current sources having mutual conductances $-G_1$ and $-G_2$ respectively. The output of the unity gain amplifier 13 is applied as a second input to each of the summing circuits 24, 27.

The operation of the BORSHT circuit illustrated in FIG. 1 will now be described. Essentially a signal $v_R$ applied between the receive terminal 3 of the four-wire interface and ground will cause a differential signal to appear at the terminals 1, 2 of the two-wire interface and thus to be applied to a subscriber line connected thereto.

The received signal $v_R$ is fed via the unity gain inverting amplifier 16, 17, 18 and is applied via the summing circuit 24 to the output stage 25 and, after further inversion in the unity gain amplifier 26, through the summing circuit 27 to the output stage 28.

Any signal originating on the subscriber line and thus applied differentially to the terminals 1 and 2 of the two-wire interface will cause a signal $v_T$ to appear between the transmit terminal 4 of the four-wire interface and ground. Any signal applied between ground and the terminals 1 and 2 equally is considered to be a common mode (or longitudinal) signal and ideally should not produce any output signal at the terminal 4.

In FIG. 1 the subscriber line is shown represented by a load $Y_L$ connected differentially between the terminals 1, 2. A current generator $i_1$ represents a signal originating on the subscriber line and equal current generators $i_c$ represent common mode signals. Signal voltages appearing at the terminals 1 and 2 respectively are given by voltages $v_1$ and $v_2$.

These signal voltages appearing at the terminals 1 and 2 of the two-wire interface are coupled to the input terminals 7 and 8 of the differential to single-ended converter 9 which will provide an output signal given by $$\frac{R_b + R'_b}{R_a + R'_a + R_b + R'_b}(v_1 - v_2) = B(v_1 - v_2), \text{ say}$$

where $R_a$, $R_b$, $R_a'$ and $R_b'$ are the values of the resistors 5, 10, 6 and 11 respectively. The amplifier 13, being coupled to the terminal 12 will provide an output signal given by $$\frac{(R'_a + R'_b)v_1 + (R_a + R_b)v_2}{R_a + R'_a + R_b + R'_b} = \frac{v_1 + v_2}{2} + E(v_1 - v_2)$$

$$\text{where } E = \frac{(R_a - R'_a) + (R_b - R'_b)}{R_a + R'_a + R_b + R'_b}$$

in the preferred case the value of $R_a$ will equal that of $R_a'$ and also the value of $R_b$ will equal that of $R_b'$ and therefore the value of E will be zero.

The amplifier 13 is therefore designed to respond to the common mode signals appearing at the terminals 1 and 2 and defined as half the sum of the currents flowing in the two wires of the subscriber line. The output of the amplifier 13 is coupled to the second input of the summing circuits 24 and 27 so that this amplifier essentially provides a feedback routing loop for common mode signals forced onto the subscriber such that the common mode currents $i_c$ are absorbed by the power output stages 25 and 28.

The output of the differential to single ended converter 9 provided at its output terminal 14 is fed via the unity gain inverting amplifier 16, 17, 18 and the unity gain inverting amplifier 20, 21, 22 to produce the output signal $v_T$ at the terminal 4 of the four wire interface. Output current from the amplifier 16 also flows to provide an output current from the output stage 25 and (assuming $G_1=G_2$) an equal inverted output current from the output stage 28. This differential current given by $B(v_1-v_2) G_1$, together with the much smaller current flowing via resistors 5, 7, 6 and 11 equals the current $i_1$. The voltage necessary to engender this current determines the two wire output impedence of the circuit which is approximately equal to $1/BG_1$.

Any input signal $v_R$ applied to the input terminal 3 of the three wire interface will, in addition to producing an output current from the amplifier 16 which is fed to provide a differential output voltage at the terminals 1 and 2 of the two-wire interface, provide an input current via the resistor 23 to the amplifier 20, which will also receive a further input current fed from the amplifier 16 via the resistor 22. The value $R_2$ of the resistor 23 is chosen such that the input current due to $v_R$ and that fed to the input of the amplifier 20 via resistors 23 and 22 sum to zero and no component of the signal $v_R$ appears at the transmit terminal 4 of the four-wire interface.

The sum of the input currents fed to the input of the amplifier 16 via the feedback resistor 17 and from the differential to single-ended converter 9 matches the current fed from the terminal 3 via the resistor 19.

The above is a simplified description of the signal paths occuring in the circuit of FIG. 1. Network analysis of the circuit yields the following more detailed analysis of the operation of the circuit.

$$\left[ v_R - (B+E)(v_1 - v_2) - \frac{v_1 + v_2}{2} \right] G_1 = \quad 1$$

$$(v_1 - v_2) Y_L + i_l - i_c$$

$$\left[ v_R - (B-E)(v_1 - v_2) + \frac{v_1 + v_2}{2} \right] G_2 = \quad 2$$

$$(v_1 - v_2) Y_L + i_l + i_c$$

$$v_R - B(v_1 - v_2) - v_R \frac{R_1}{R_2} = v_T \quad 3$$

Equations 1 and 2 may be re-written.

$$v_1 \left[ -(B+E)G_1 - \frac{G_1}{2} - Y_L \right] +$$

$$v_2 \left[ (B+E)G_1 - \frac{G_1}{2} + Y_L \right] = i_l - i_c - v_R G_1$$

$$v_1 \left[ -(B-E)G_2 + \frac{G_2}{2} - Y_L \right] +$$

$$v_2 \left[ (B-E)G_2 + \frac{G_2}{2} + Y_L \right] = i_l + i_c - v_R G_2 \text{ or}$$

-continued $$\begin{bmatrix} v_1 \\ v_2 \end{bmatrix} [A] = \begin{bmatrix} X_1 \\ X_2 \end{bmatrix} \text{ say}$$

Whence $$\text{Whence } v_1 - v_2 = \frac{X_2(A_{12} + A_{11}) - X_1(A_{22} + A_{21})}{D}$$

D being the determinant of the A matrix $$= \frac{-X_1 G_2 - X_2 G_1}{D}$$

$$= \frac{v_R 2 G_1 G_2 - i_1(G_1 + G_2) - i_c(G_1 - G_2)}{2BG_1 G_2 + Y_L(G_1 + G_2)}$$

Thus $$v_1 - v_2 = \frac{v_R - i_l \frac{G_1 + G_2}{2G_1 G_2} - i_c \frac{G_1 - G_2}{2G_1 G_2}}{B\left[1 + \frac{Y_L(G_1 + G_2)}{2BG_1 G_2}\right]} \quad 4$$

Substituting in equation 3 yields $$v_T = v_R \frac{\left[\left(1 - \frac{R_1}{R_2}\right)\left[1 + \frac{Y_L(G_1 + G_2)}{2BG_1 G_2}\right] - 1\right] + i_l \frac{G_1 + G_2}{2G_1 G_2} - i_c \frac{G_1 - G_2}{2G_1 G_2}}{1 + \frac{Y_L(G_1 + G_2)}{2BG_1 G_2}} \quad 5$$

For the purpose of the following analysis it will be assumed that the admittance of the subscriber line is real and is matched to the output impedence of the circuit and also that the value $R_2$ of the resistor 23 has been chosen to make the coefficient of the signal $v_R$ in equation 5 zero. A signal received at the terminal 3 will therefore not produce any directly resulting signal at the terminal 4.

Equations 4 and 5 then reduce to $$v_1 - v_2 = \left[ v_R - i_l \frac{G_1 + G_2}{2G_1 G_2} - i_c \frac{G_1 - G_2}{2G_1 G_2} \right] /2B \quad 6$$

$$v_T = i_l \frac{G_1 + G_2}{4G_1 G_2} - i_c \frac{G_1 - G_2}{4G_1 G_2} \quad 7$$

These equations fully specify the signal frequency behaviour of the circuit, with three independent input signals $v_R$, $i_l$, $i_c$ and two output signals $(v_1-v_2)$, appearing differentially between terminals 1, 2, and $v_T$, appearing with reference to ground at terminal 4.

The problem of common mode rejection is shown in equation 7 where $v_T$ is seen to contain a component $$\frac{i_c(G_2 - G_1)}{4G_1 G_2}$$

The common mode rejection may be defined as $$\left| \frac{\partial v_T}{\partial i_l} \bigg/ \frac{\partial v_T}{\partial i_c} \right| = \left| \frac{G_1 + G_2}{G_1 - G_2} \right|$$

Typical specifications call for 60 dB rejection necessitating $$G_1 - G_2 < G_1/500$$

that is that the gains of the output amplifiers 23, 24 in FIG. 1 be matched to 0.2%.

In a preferred form of the method of the invention a simulated common mode signal is applied to the two wire interface terminals 1 and 2 and a signal induced by the simulated common mode signal is detected and adjustment is made of one or both of the gains of the signal paths which couple the terminal 3 with the terminals 1 and 2 and which include the output amplifier stages 25 and 28.

A common mode simulator is provided which supplies nominally equal currents $i_a$, $i_b$ commutatively to the two-wire interface terminals 1, 2. In other words during a first phase a current $i_a$ is applied to the terminal 1 and a current $i_b$ to the terminal 2 whilst during a second phase a current $i_b$ is supplied to the terminal 1 and the current $i_a$ to the terminal 2. It is important that the variation in the values of the currents due to their commutation be much less than the precision of adjustment required. A circuit for supplying such currents is illustrated in FIG. 2 to which reference will now be made.

Figure 2:
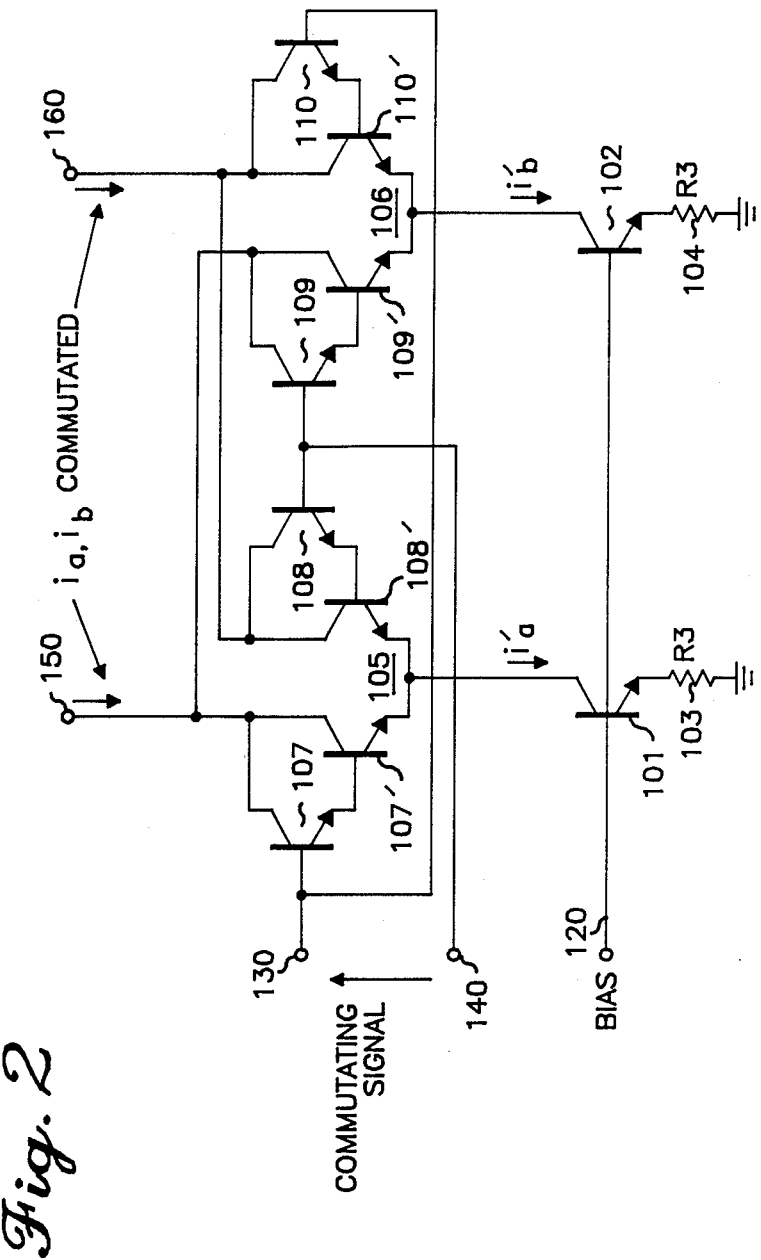
FIG. 2 is a schematic illustration of a circuit for switching currents to the two-wire interface of the circuit of FIG. 1.

The arrangement of FIG. 2 comprises twin current sources provided by transistors 101, 102 whose collectors supply currents $i_a'$ and $i_b'$ respectively and whose emitters are coupled to ground via reistors 103 and 104 respectively each of a value $R_3$. The bases of the transistors are coupled together and to a terminal 120 to which, in operation is applied a dc bias voltage.

The currents $i_a'$ and $i_b'$ feed current switching stages 105 and 106 respectively which are realised with Darlington emitter-coupled transistor pairs.

The switching stage 105 comprises a first Darlington pair formed by transistors 107 and 107'. The collectors of the transistors 107 and 107' are connected together and the emitter of the transistor 107 is connected to the base of the transistor 107'.

A second Darlington pair is formed by transistors 108 and 108', the collectors of the transistors 108 and 108' being connected together and the emitter of the transistor 108 being connected to the base of the transistor 108'. The emitters of the transistors 107' and 108' are connected together and to receive the current $i_a'$ fed from the transistor 101.

The switching stage 106 is also provided by two Darlington pairs formed by transistors 109, 109' and transistors 110 and 110' connected together in exactly similar manner to the transistors 107, 107', 108 and 108'. The collectors of the transistors 107 and 107' are connected to the collectors 109' and 109 and to a first output terminal 150 whilst the collectors of the transistors 108 and 108' are connected to the collectors of the transistors 110 and 110' and to a second output terminal 160.

The base of the transistor 107 is connected to the base of the transistor 110 and to a control input terminal 130 whilst the bases of the transistors 108 and 109 are connected together and to a control input terminal 140.

A control signal having first and second polarities and referred to hereafter as a commutating signal is applied differentially between the terminals 130 and 140. The circuit is rendered operational by applying a dc bias potential to the terminal 120.

With the commutating signal of a first polarity such that the terminal 130 is positive with respect to the terminal 140 the current $i_a'$ is routed via the Darlington transistor pair formed by the transistors 107 and 107' to the output terminal 150 whilst the current $i_b'$ supplied by the transistor 102 is routed via the Darlington pair formed by the transistors 110 and 110' to the output terminal 160.

When the polarity of the commutating signal is reversed the current supplied by the transistor 101 is routed via the Darlington transistor pair 108, 108' to the output terminal 160 and the current supplied by the transistor 102 is routed via the Darlington transistor pair 109, 109' to the output terminal 150.

The current transfer factor of a Darlington transistor pair such as described above is typically within 0.1% of the ideal value of unity. Also the current transfer factors of a group of Darlington transistors fabricated in the same integrated circuit will match very closely. Thus the current $i_a$ fed to the output terminal 150 for a commutating signal having the first polarity will be transferred to flow to the output terminal 160 when the polarity of the commutating signal reverses, with a precision typically better than 0.01%.

Likewise the current $i_b$ caused to flow in the terminal 160 in response to a commutating signal of the first polarity will be transferred with similar precision to flow at the output terminal 150 when the polarity reverses.

The output terminals 150, 160 of the common mode simulator circuit of FIG. 2 are connected respectively to the two-wire interface terminals 1, 2 of the BORSHT circuit of FIG. 1 in order to apply the simulated common mode signals to the circuit.

Figure 3:
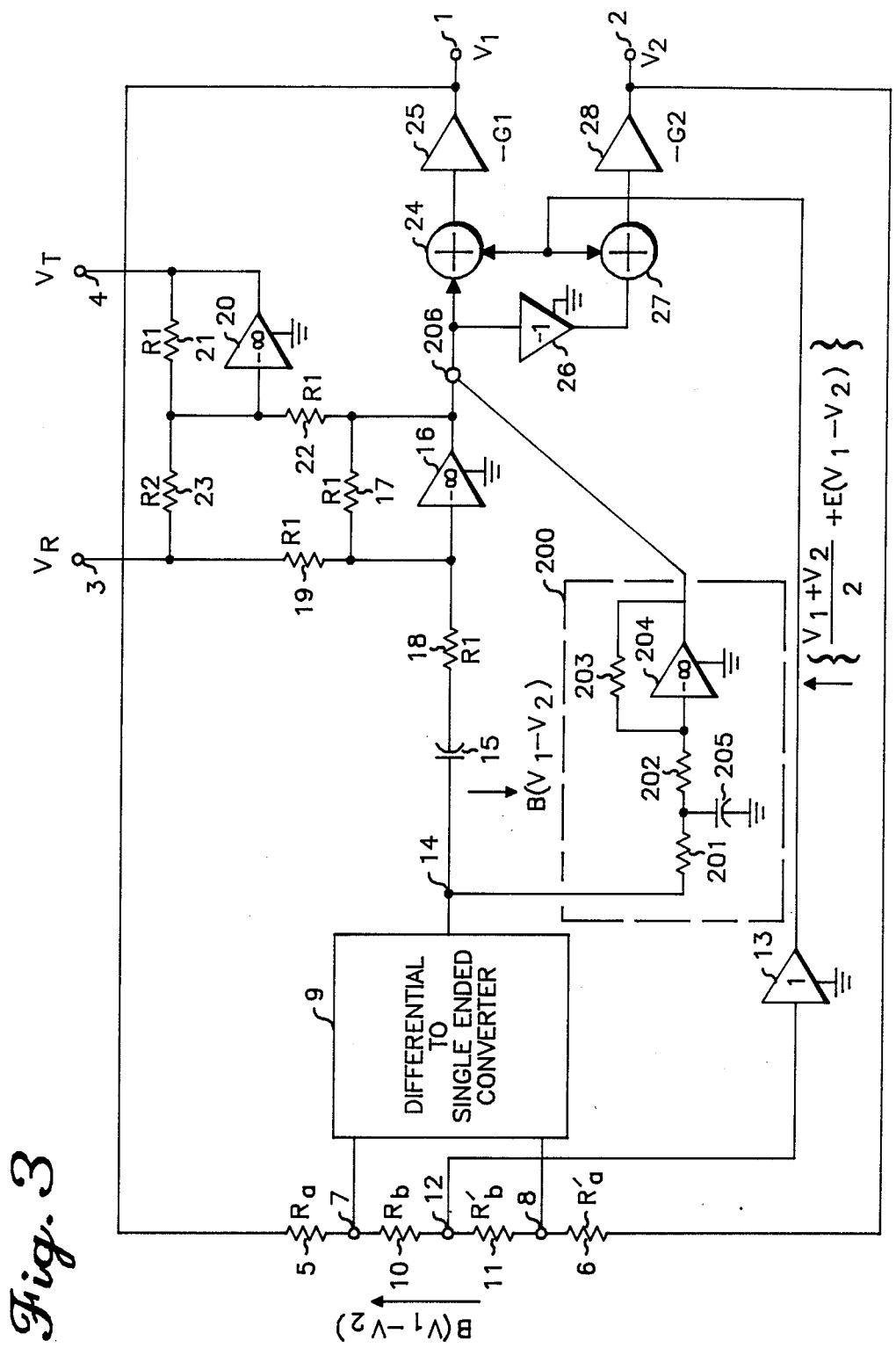
FIG. 3 is a more detailed representation of the circuit of FIG. 1.

Reference will now be made to FIG. 3 of the drawings which illustrates schematically a more complete block diagram of the BORSHT circuit than that shown in FIG. 1. Like parts to those in FIG. 1 bear like reference numbers and the present description of FIG. 3 will be confined to those elements which are different from those in FIG. 1. The circuit illustrated in FIGS. 1 contained only signal frequency parts. FIG. 3 illustrates additional elements which are provided in order to define the dc differential mode output resistance of the circuit.

The additional elements form a dc amplifier 200 connected between the output terminal 14 of the differential to single-ended converter 9 and a summing circuit 206 connected in the signal path between the output of the amplifier 16 and the inputs of the summing circuit 24 and the amplifier 26. The summing circuit 206 has one input connected to the output of the amplifier 200 and a second input connected to the output of the amplifier 16. The output of the summing circuit 206 feeds the inputs of the summing circuit 24 and the amplifier 26.

The dc amplifier 200 includes two series connected resistors 201, 202, the second terminal of the resistor 201 being connected to the output terminal 14 of the differential to single-ended converter 9 whilst the second terminal of the resistor 202 is connected to the input of a high gain inverting amplifier 204 provided with a feedback resistor 203 connected between its output and its input. A decoupling capitor 205 is connected between the junction of the resistors 201, 202 and ground and ensures that the amplifier 200 is rendered unresponsive to signal frequencies. The output of the amplifier 204 also forms the overall output of the dc amplifier 200.

The summing circuit 206 permits the output voltage provided by the dc amplifier 200 to be added to that of the signal frequency amplifier 16, 17, 18. The dc amplifier therefore completes a dc differential mode feed back loop within the overall circuit.

The output terminals 150, 160 of the common mode simulator circuit of FIG. 2 are connected in operation to the two-wire interface terminals 1, 2 respectively. When the common mode simulator of FIG. 2 is activated currents $i_a$, $i_b$ are supplied commutatively to the terminals 1, 2.

These applied currents can, for each phase of commutation be considered to be decomposed into a common mode and a differential mode component. During phase A, in which the current $i_a$ is supplied to the terminal 1 and the current $i_b$ is supplied to the terminal 2 the common mode component will be defined as $i_{CA}$ and the differential mode component as $i_{DA}$. Likewise during Phase B these components are defined as $i_{CB}$ and $i_{DB}$ respectively.

Using the sign convention that common mode currents flowing into the BORSHT circuit are positive and that a differential mode current flowing from terminal 1 to terminal 2 is positive then;

$$i_{CA} = \frac{-(i_a + i_b)}{2}$$

$$i_{DA} = \frac{(i_b - i_a)}{2}$$

$$i_{CB} = \frac{-(i_b + i_a)}{2}$$

$$i_{DB} = \frac{(i_a - i_b)}{2}$$

For simplicity of further explanation it will be assumed that the two-wire subscriber line presents no loading to the BORSHT circuit and that the resistance of the network formed by the resistors 5, 6, 10, 11 is high enough for its loading effect to be neglected also. In any event detailed analysis would show that such loading effects do not effect the basic operation of the invention.

The currents supplied by the common mode simulator to the terminals 1, 2 must therefore be absorbed thereat due to the action of the common mode feedback loop via the resistor network 5, 6, 10, 11 and the amplifier 13 and the action of the dc differential mode feedback loop via the same resistor network, the differential to single ended convertor 9 and the amplifier 200.

In order that the currents be absorbed the voltage at the output of the dc amplifier 200 must change by an amount $v_{OA}$ given by $$v_{OA} = \frac{1}{2G_1G_2}(i_aG_2 - i_bG_1)$$

during Phase A and by an amount $v_{OB}$ given by $$v_{OB} = \frac{1}{2G_1G_2}(i_bG_2 - i_aG_1)$$

during Phase B.

By adding the voltage changes produced during the two phases of operation of the common mode simulator a voltage $v_{OAB}$ is obtained given by $$v_{OAB} = v_{OA} + v_{OB} = \frac{1}{2G_1G_2}(i_a + i_b)(G_2 - G_1)$$

and this voltage is proportional to any mismatch between the gains $G_1$, $G_2$ of the amplifiers 25, 28 respectively. As has been shown earlier mismatching of the gains G1, G2 causes transmission of common mode signals to the four-wire interface transmit terminal 4. The voltage $v_{OAB}$ thus indicates the common mode rejection of the circuit. This may be optimised by adjusting one or more of the gains of the signal paths which include the amplifiers 25, 28 in order to minimise the value of $v_{OAB}$.

It is not necessary that the currents $i_a$, $i_b$ supplied by the common mode simulator of FIG. 2 be precisely equal, only that their values be substantially unaffected by the commutation between the output terminals.

The voltage changes $v_{OA}$, $v_{OB}$ produced at the output of the amplifier 200 during the two phases of operation A, B of the common mode simulator are preferably summed by making the two phases of equal length and integrating the output voltage of the amplifier 200 over the total period. The integration is then repeated over the same period with the common mode simulator disabled and the results of the two cases subtracted.

Such time periods may be defined extremely accurately for example by counting from a crystal oscillator and the integration provides immunity to noise or interference signals.

A preferred embodiments of a BORSHT circuit arrangement in accordance with the invention will now be described with reference to FIG. 4. The arrangement of FIG. 4 includes all the elements of FIG. 3 but for simplification only those parts of FIG. 3 necessary to the explanation have been illustrated and the following description will be substantially confined to those elements of FIG. 4 which have no counterpart in FIG. 3. Like parts in FIGS. 3 and 4 bear like reference numerals.

Figure 4:
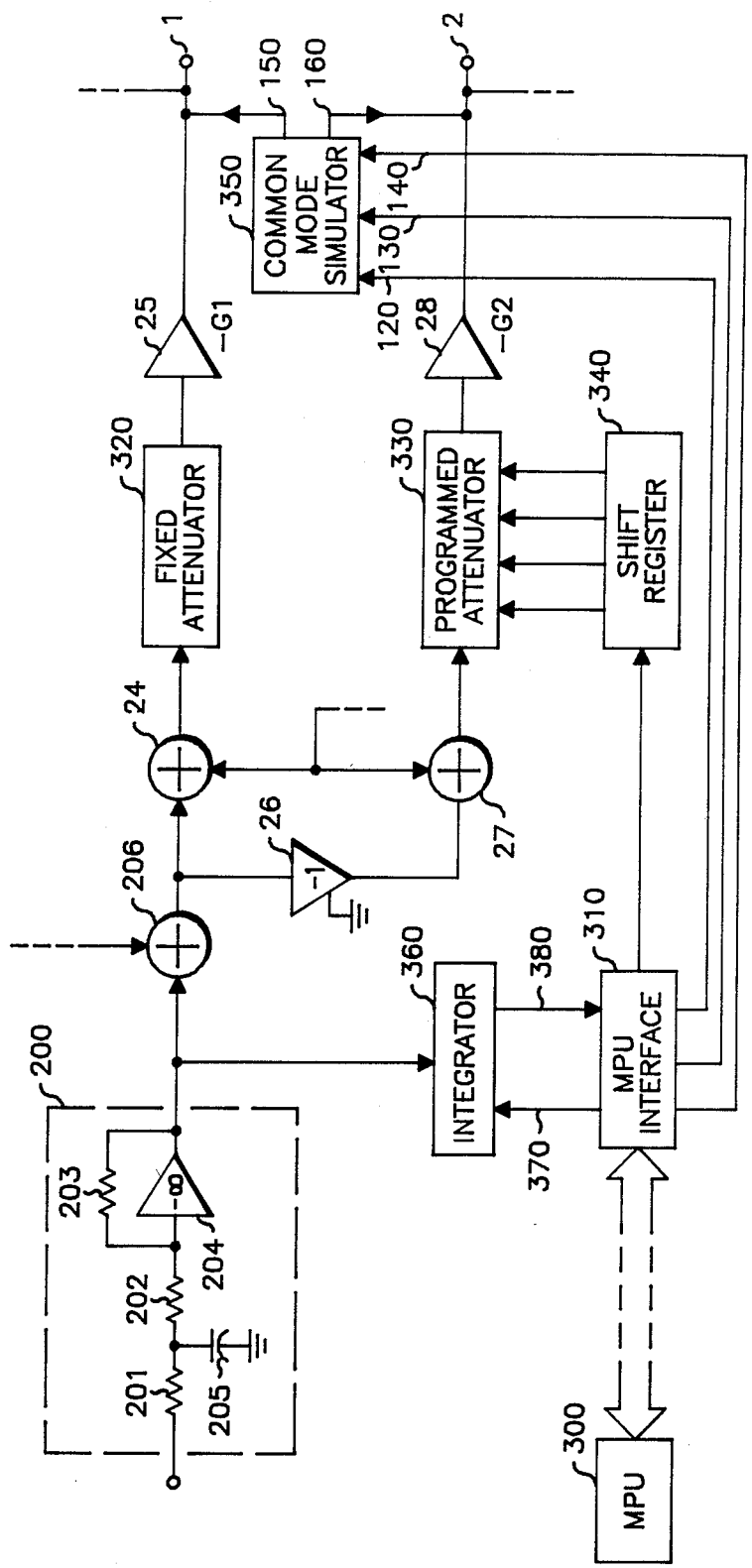
FIG. 4 illustrates part of a preferred embodiment of a BORSHT circuit in accordance with the invention.

The arrangement of FIG. 4 operates under the control of a microprocessor 300 via a microprocessor interface circuit 310. This interface circuit would in practice be connected to send and receive data or instructions to numerous sections of the BORSHT circuit. In FIG. 4 only those links relevant to the present discussion are shown.

In order to match the gains of the two signal paths feeding the two-wire interface terminals 1, 2 ie the effective gains of the amplifiers 25, 28, the former amplifier is preceded by a fixed attenuator 320 and the latter by a programmable attenuator 330. The programmable attenuator is set by means of a binary coded control signal fed from a shift register 340. The attenuation provided by the fixed attenuator 320 and the range of settings of the programmable attenuator 320 are made sufficient to cover the maximum mismatch which may occur between the gains $G_1$, $G_2$ of the amplifiers 25 and 28 respectively.

The common mode simulator circuit of FIG. 2 is represented by the block 350. This is connected to receive the bias voltage at its input terminal 120 and a differential commutating signal between the terminals 130 and 140. The bias voltage and the commutating signal are fed from the microprocessor interface circuit 310.

The output voltage of the dc amplifier 200 is fed to an integrator 360 which is connected to receive a reset signal from the microprocessor interface circuit 310 at an input terminal 370 and to provide an output signal from an output terminal 380 which is fed to the microprocessor interface circuit 310.

Under normal service conditions the common mode simulator 350 is disabled, the bias signal applied to the input terminal 120 from the microprocessor interface circuit 310 being set to zero.

When an auto balance operation is to be carried out to equalise the effective gains of the amplifiers 25 and 28, the microprocessor 300 provides a signal via the microprocessor interface circuit 310 which simultaneously resets the integrator output to zero via the input terminal 370 and initiates a first phase of the balancing operation in which a commutating signal is applied in a first sense to the input terminals 130 and 140 of the common mode simulator 350.

After a predetermined first period of time the microprocessor 300 inverses the phase of the commutating signal. After a second period equal to the first the microprocessor reads the output of the integrator circuit 360 via the output terminal 380 and the microprocessor interface circuit 310 and stores the result.

Optionally and dependent upon the precise detail of the circuit realisation the microprocessor then disables the common mode signal generator 350, resets the integrator to zero, waits for a period equal to twice the first period and then once more reads the integrator output and substracts the result from that previously stored. This sesquence compensates for any quiescent output from the amplifier 200 or from the integrator 360.

The integrator output signal stored in the micro processor 300 indicates the level of mismatch between the gains $G_1$, $G_2$ and dependent on the particular program used in the microprocessor, may calculate the adjustment required to reduce the mismatch to an acceptable level or may change the gain by a predetermined increment in the appropriate sense and repeat the operation. In either case the micro processor will transmit via the interface 310 the appropriate binary word to the shift register 340 in order to set the attenuation of the programmable attenuator 330 to a new value.

Modifications may be made to the described arrangements without departing from the scope of the invention. In particular it is not necessary for the common mode signal generator to feed nominally equal currents to the terminals 1, 2. In principle only a single current $i_a$ or $i_b$ is required. In such a case only one half of the circuit arrangement of FIG. 2 would be needed to provide the common mode signal generator ie the transistor 101, and the switching stage 105. In such a case during a first phase a current $i_a$ would be applied to the terminal 1 with no current applied to the terminal 2 whilst during a second phase the position would be reversed.

It is however preferred to commutate nominally equal currents between the output terminals 150 and 160 of the common mode signal generator so that voltage excursiona $v_{OA}$, $v_{OB}$ produced at the output of the amplifier 200 are then nominally zero. The operating range required of the circuit used to sum the two values is thus reduced increasing the accuracy attainable.

In order to minimise the power dissipation of the circuit the linear output stages 25, 28 illustrated may be realised by push-pull stages. The gains of these stages may be defined by different means according to the sense of the output current being supplied.

Assuming the output amplifier 25 provides gains $G_1$, $G_1'$, say, for respectively positive and negative output currents, and output stage 28 provides corresponding gains $G_2$, $G_2'$ the gains which must be matched to provide the desired common mode rejection may be any of the combinations $G_1 G_2$, $G_1' G_2'$, $G_1 G_2'$ and $G_1' G_2$ dependent on the senses of the total output currents. It follows that all these cominbinations must be matched, that three adjustments are then required and that means for causing the output amplifiers to supply currents in define senses during the adjustment procedure are required.

Matching of the gain combinations listed above may of course be assured by matching any three. The output currents may be forced to the senses required in each case by the application of appropriate dc signals during each adjustment phase. The possible techniques include simply applying constant current generators to the output terminals or applying constant voltages to the receive terminal $v_R$ and/or input of the common mode feed back loop amplifier 13. The three adjustments necessitate that the circuit be provided with three groups of gain adjustment means and three groups of storage means for maintaining the adjustments. This may be provided by three switchable resistor networks and three associated sets of latching switches.

The superposition of quiescent levels on the output currents during the adjustment might engender an absolute increase in the quiescent voltage at some nodes at which the signal $B(v_1-v_2)$ could be measured. The measurement system must in such a case be designed to operate over the necessary dynamic range.

I claim:

1. A method for providing common mode signal rejection in a BORSHT/SLIC circuit having a transmit signal path coupling a pair of terminals of a two-wire subscriber line interface with a transmit terminal of a four-wire interface and a pair of signal paths coupling a receive terminal of the four-wire interface with the pair of terminals, the pair of signal paths having predetermined gains associated therewith, the method including the steps of:
   periodically switching an applied current from one to the other of the pair of terminals of the two-wire subscriber line interface;
   detecting a common mode signal induced on the transmit signal path in response to said applied current being switched at the pair of terminals; and
   adjusting the gain of at least one of the pair of signal paths in response to said detected common mode signal thereby reducing the magnitude of the common mode signal which otherwise is induced in said transmit signal path.

2. A method as claimed in claim 1 wherein the applied current is a direct current.

3. A method as claimed in claim 2 wherein nominally equal currents are applied to both terminals of the two-wire interface and are periodically switched between said both terminals in synchronism with one another.

4. A method as claimed in claim 2 wherein the common mode signals are detected by summing currents derived from said transmit signal path during each of two phases of the periodic switching.

5. A method as claimed in claim 1 wherein the applied current is a signal frequency current.

6. A method as claimed in claim 5 wherein nominally equal currents are applied to the pair of terminals and are periodically switched therebetween in synchronism with one another.

7. A method as claimed in claim 5 wherein the common mode signals are detected by summing currents derived from said transmit signal path during each period of periodically switching the applied current.

8. A BORSHT/SLIC circuit having a transmit signal path coupling a transmit terminal thereof to a pair of terminals and a pair of signal paths coupling a receive terminal of the circuit to the pair of terminals, each one of said pair of signal paths having a predetermined gain associated therewith, comprising:
 means for periodically switching an applied current from one to the other of the pair of terminals;
 means for detecting common mode signals induced in the transmit signal path in response to said applied current; and
 means responsive to the detected common mode signals for adjusting the gain of at least one of the pair of signal paths such that the magnitude of common mode signals are reduced.

9. A circuit as claimed in claim 8 wherein the means for perodically switching an applied current comprises means for applying nominally equal currents to said pair of terminals and periodically switching said equal currents from one terminal to the other in synchronism with one another.

10. A circuit as claimed in claim 9 wherein said means for detecting the common mode signals includes means for summing currents derived from said transmit signal path during each of two phases of the periodic switching.

11. A circuit as claimed in claim 10 wherein said means for adjusting the gain of the at least one signal path includes a programmable attenuator located in said at least one signal path.

12. A circuit as claimed in claim 11 wherein said means for adjusting the gain of said at least one signal path includes a microprocessor control means responsive to said detected common mode signals.

13. The circuit of claim 8 wherein said means detecting common mode signals includes means for summing currents derived from said transmit signal path during each period of periodically switching an applied current.

14. The circuit of claim 13 wherein said means for adjusting said gain of said at least one of the pair of signal paths includes a programmable attenuator located in said at least one of the pair of signal paths.

15. The circuit of claim 14 wherein said means for adjusting said gain of said at least one of the pair of signal paths includes a microprocessor control means responsive to said detected common mode signals.

* * * * *